Patented June 11, 1929.

1,716,721

UNITED STATES PATENT OFFICE.

GEORGE HOLLAND ELLIS, OF SPONDON, NEAR DERBY, ENGLAND, ASSIGNOR TO CELANESE CORPORATION OF AMERICA, A CORPORATION OF DELAWARE.

TREATMENT OF CELLULOSE DERIVATIVES.

No Drawing. Application filed March 17, 1927, Serial No. 176,289, and in Great Britain April 10, 1926.

This invention relates to the dyeing, printing or stencilling of threads, yarns, fabrics, films or other products made with or containing cellulose acetate.

In my previous U. S. Patent No. 1,618,413 I have described processes for dyeing, printing or stencilling the goods of or containing cellulose acetate by means of any coloring matters or organic compounds which have an affinity for cellulose acetate or which are capable of coloring the same, but which are insoluble or practically insoluble in water or are of relatively low solubility in water, said coloring matters or organic compounds being employed in the form of soluble or more soluble modifications obtained by treating them, prior to addition to the dyebaths or preparations for printing and the like, with sulphoricinoleic or other sulphated fatty acids or other bodies having oily or fatty characteristics, namely higher fatty acids or sulphonated or other derivatives thereof containing salt forming groups or with salts of such acids or bodies, for instance their alkali or ammonium salts, or with mixtures of two or more than two of these solubilizing agents.

According to the present invention I employ for the dyeing, printing or stencilling of cellulose acetate or goods containing the same any organic compounds or coloring matters which have affinity for cellulose acetate or are capable of coloring the same, but which are insoluble or practically insoluble in water or are of relatively low solubility in water. These organic compounds or coloring matters are employed in the form of their soluble or more soluble modifications prepared by pretreatment with solubilizing agents consisting of or comprising one or more bodies being soluble resin soaps, that is, sodium or other soluble salts or soaps of resin acids.

Preferably such salts or soaps should be as free as possible from free alkali in order to preclude saponification of the cellulose acetate.

The present invention includes the use of any organic compounds or coloring matters which have affinity for cellulose acetate or which are capable of coloring the same, but which are insoluble or practically insoluble in water or are of relatively low solubility in water. All such coloring matters or compounds are hereinafter in the claims included in the expression "relatively water insoluble organic compounds capable of coloring cellulose acetate." This expression applies equally to simple amino bases and developers used in the azoic or development process in the sense that these are capable of coloring cellulose acetate by the production of the color upon the fibre or material.

Thus for instance I may employ insoluble, practically insoluble or relatively low soluble organic compounds or coloring matters belonging to the classes more specifically mentioned in U. S. Patent No. 1,618,413, for instance unsulphonated or other insoluble or relatively low soluble organic compounds or coloring matters of the "azo" class; coloring matters or compounds of the diphenylmethane class; triphenylmethane class; triarylmethane class; oxazine class; thiazine class; unreduced indigoid class; basic derivatives of the anthraquinone series; or simple amino bases for application for dyeing or coloring the cellulose acetate by the azoic or development process, such for example as paranitraniline, metanitraniline, benzidine, dianisidine, dimethylaniline, alphanaphthylamine and diphenylamine, the color in this latter case (azoic or development process) being produced on the material by subsequent diazotization of the simple amino base and development with a developer.

Again, I may employ insoluble or relatively low soluble pyrazolone derivatives, e. g. unsulphonated azo derivatives of pyrazolone compounds, such as are referred to in U. S. Patent No. 1,600,277.

Again for example, I may employ insoluble or relatively low soluble coloring matters specified in U. S. Patent No. 1,641,965, i. e. vat dyestuffs of the anthraquinone series in the unreduced state, for example those marketed under the registered trade marks, Indanthrene, Cibanone, Algol, Helindone or other vat dyestuffs of the anthraquinone series in unreduced state.

Again, for example I may employ insoluble or relatively low-soluble nitro derivatives of diarylamines such as are referred to in U. S. Patent No. 1,618,415.

Again for example I may employ coloring matters or compounds of the stilbene group containing no sulpho groups in their constitution, such as are referred to in my U. S. application S. No. 93,779.

Or, for example, I may employ acidyl derivatives of amino anthraquinones or substituted amino anthraquinones, containing aliphatic acidylamino groups, such as are referred to in my U. S. application S. No. 98,614.

It is to be understood that any other insoluble or relatively low soluble coloring matter or compound having affinity for cellulose acetate or capable of coloring the same may be used for the process of the present invention.

The insoluble or relatively low soluble organic compounds or coloring matters for use in the present invention will usually contain no strongly acidic groups such as the sulpho group, and when basic compounds or coloring matters are employed they are always used in form of the base and not in the form of salts such as the hydrochloride or other such salts.

The solubilization of the insoluble or relatively low soluble organic compounds or coloring matters may be effected by mixing or grinding them with one or more solubilizing agents of the present invention, in presence or absence of water, or in presence of larger quantities of water with subsequent concentration or drying, and heating if necessary, the solubilized modifications being filtered if desired before addition to the dyebaths or other preparations for dyeing or otherwise coloring the goods containing cellulose acetate.

The dyeing or otherwise coloring of the goods may be effected in the usual manner.

If the compound or coloring matter applied according to the process of the present invention contains diazotizable primary amino groups, it may be diazotized and developed on the material in the usual manner to form a further dyestuff or dyestuffs.

When dyeings or colorings are to be produced by the azoic process the insoluble or relatively insoluble component (whether base or developer) may be solubilized with the agents of the present invention and the dyeing or developing conducted as usual.

It is understood that the invention extends not only to the dyeing, printing or stencilling of goods composed wholly of cellulose acetate, but also to the dyeing, printing or stencilling of "mixed" yarns, fabrics or materials containing cellulose acetate associated with cotton, silk, wool or other threads or fibres.

Mixed goods may be dyed or otherwise colored in uniform or contrasting effects with or without employment of other dyestuffs or components according to the character of the non-acetate portion of the goods, said other dyestuffs or components being applied if desired before or after the application of the aforesaid insoluble or relatively low soluble dyestuffs or compounds, or when not deleteriously affected thereby they may be applied in conjunction therewith.

The solubilizing agents employed for the purpose of the present invention may be prepared in any known or suitable way; preferably, as before mentioned, they should be as free as possible from free alkali in order to preclude saponification of the cellulose acetate.

The following example may conveniently be given to show one method by which the solubilizing agent of the present invention may be prepared, it being of course understood that I in no may limit myself to the use of solubilizing agents so prepared:—

*Example A.*

2 parts by weight of caustic soda are dissolved in 60 parts of water, and heated to boiling point. 22 parts of pale commercial resin, in powder form, are now slowly added with stirring. This quantity is usually sufficient to neutralize all the caustic soda, but slight adjustment may be required either way, according to the materials used. The whole is now boiled for three to four minutes and allowed to cool. The resulting clear yellow pasty mass is approximately a 25% resin soap soluble in water to give a faint cloudy solution.

The following examples serve to illustrate how the invention may be carried out, it being understood that they are in no way limitative and may be varied widely.

*Example 1.*

To dye a full blue violet shade on 10 kilogrammes of cellulose acetate yarn in hank form, 100 grammes of finely divided 1 amino-4-methylamino anthra quinone are intimately mixed with 2 kilogrammes of the 25% resin soap prepared as described in Example A above, heated to the boil for five minutes or until as homogeneous as possible, and slowly diluted with boiling water to 20 litres. The whole is now added through a filter cloth to 250 litres of water, the goods are entered and the temperature raised during 3/4 hour to 75–80° C.

After dyeing for 3/4 hour at this temperature the hanks are rinsed, well washed off in soft water, and dried or otherwise treated as desired.

*Example 2.*

To dye a full orange shade on 10 kilogrammes of cellulose acetate yarn in hank form, 100 grammes of 1-amino-2-methyl anthraquinone are finely powdered and added to 2 kilogrammes of the 25% resin soap (prepared as described in Example A above). The mixture is boiled till as homogeneous as possible, slowly diluted with boiling water to 20 litres, and added through a filter cloth to a 250 litres dyebath.

The goods are now entered and the dyeing operation carried through as in Example 1. The yarn which is now dyed a full orange shade, is rinsed well in soft water and may be dried or otherwise treated as desired.

*Example 3.*

To dye a full golden yellow shade on 10 kilogrammes of cellulose acetate yarn in hank form, 100 grammes of 2-4-dinitro-4-hydroxy diphenylamine are finely powdered and intimately mixed with 2 kilogrammes of the 25% resin soap (prepared as in Example A above) as in Example 1. After suitable dilution with boiling water as in the previous examples, the dispersion is poured through a filter cloth into a 250 litre dyebath, and dyeing carried out as in the above examples.

The goods which are dyed a full bright golden yellow shade are lifted, rinsed and dried or otherwise treated as desired.

*Example 4.*

To dye a bright orange shade on 10 kilogrammes of cellulose acetate yarn in hank form, 400 grammes of paranitrobenzene azo diphenylamine 25% aqueous paste are intimately mixed with 2 kilogrammes of the 25% resin soap (prepared as described in Example A above) heated to the boil for five minutes or till as homogeneous as possible, and slowly diluted with boiling water to 20 litres. The whole is now added through a filter cloth to 250 litres of water, the goods entered and the temperature raised during 3/4 hour to 75-80° C. After dyeing for 3/4 hour at this temperature the hanks are raised, well washed off in soft water and dried or otherwise treated as desired.

The term dyeing as used in the appended claims is to be understood to include printing and stencilling and the term resin soap to include salts of resin acids.

What I claim and desire to secure by Letters Patent is:—

1. Process of dyeing materials comprising cellulose acetate, comprising applying thereto relatively water-insoluble organic compounds capable of colouring cellulose acetate in the form of aqueous dispersions prepared by pretreating the compounds with a solubilizing agent comprising a soluble resin soap.

2. Process of dyeing materials comprising cellulose acetate, comprising applying thereto relatively water-insoluble organic compounds capable of colouring cellulose acetate in the form of aqueous dispersions prepared by pretreating the compounds with a solubilizing agent comprising a sodium resin soap.

3. Process of dyeing materials comprising cellulose acetate, comprising applying thereto relatively water-insoluble organic compounds, containing free amino groups and capable of coloring cellulose acetate, in the form of aqueous dispersions prepared by pretreating the compounds with a solubilizing agent comprising a soluble resin soap and thereafter diazotizing and developing on the material.

4. Process of dyeing materials comprising cellulose acetate, comprising applying thereto relatively water-insoluble organic compounds, containing free amino groups and capable of coloring cellulose acetate, in the form of aqueous dispersions prepared by pretreating the compounds with a solubilizing agent comprising a sodium resin soap and thereafter diazotizing and developing on the material.

In testimony whereof I have hereunto subscribed my name.

GEORGE HOLLAND ELLIS.